(12) United States Patent
Taheri et al.

(10) Patent No.: US 11,203,419 B2
(45) Date of Patent: Dec. 21, 2021

(54) DEVICE FOR REGULATING A SETPOINT FOR A SPEED OF ROTATION OF A ROTORCRAFT ROTOR, A ROTORCRAFT FITTED WITH SUCH A DEVICE, AND AN ASSOCIATED METHOD OF REGULATION

(71) Applicant: AIRBUS HELICOPTERS, Marignane (FR)

(72) Inventors: Setareh Taheri, Aix en Provence (FR); Nicolas Certain, Aix en Provence (FR)

(73) Assignee: AIRBUS HELICOPTERS

( * ) Notice: Subject to any disclaimer, the term of this patent is extended or adjusted under 35 U.S.C. 154(b) by 819 days.

(21) Appl. No.: 15/962,258

(22) Filed: Apr. 25, 2018

(65) Prior Publication Data

US 2018/0312250 A1 Nov. 1, 2018

(30) Foreign Application Priority Data

Apr. 28, 2017 (FR) ........................................ 1770434

(51) Int. Cl.
*G05D 1/08* (2006.01)
*B64C 27/12* (2006.01)
(Continued)

(52) U.S. Cl.
CPC .............. *B64C 27/57* (2013.01); *B64C 27/12* (2013.01); *B64D 31/06* (2013.01); *G05D 1/0858* (2013.01)

(58) Field of Classification Search
CPC ..................................................... B64C 27/57
See application file for complete search history.

(56) References Cited

U.S. PATENT DOCUMENTS

| | | | | |
|---|---|---|---|---|
| 5,428,543 A | * | 6/1995 | Gold | ..................... G05D 1/0669 244/17.13 |
| 6,198,991 B1 | | 3/2001 | Yamakawa et al. | |

(Continued)

FOREIGN PATENT DOCUMENTS

| | | |
|---|---|---|
| CN | 102483630 A1 | 5/2012 |
| CN | 103895861 A1 | 7/2014 |

(Continued)

OTHER PUBLICATIONS

Chinese First Office Action & Search Report dated Oct. 10, 2020 (with English Machine Translation), Application No. 201810331646.6, Applicant Airbus Helicopters, 11 Pages.

(Continued)

*Primary Examiner* — Nicholas McFall
(74) *Attorney, Agent, or Firm* — Brooks Kushman P.C.

(57) ABSTRACT

A regulator device for regulating a control setpoint for a speed of rotation, written NR, for at least one main rotor of a rotorcraft, the rotorcraft including at least one measurement member for taking measurements representative of a current vertical elevation of the rotorcraft relative to a reference level Ref; and measurement means serving to measure at least one vertical component of a travel speed of the rotorcraft relative to the air surrounding the rotorcraft, the regulator device for regulating the control setpoint of the speed including management means for automatically controlling the control setpoint for the speed in accordance with at least two predetermined control relationships that are distinct from each other.

20 Claims, 3 Drawing Sheets

(51) Int. Cl.
*B64C 27/57* (2006.01)
*B64D 31/06* (2006.01)

(56) References Cited

U.S. PATENT DOCUMENTS

| | | | |
|---|---|---|---|
| 8,442,740 | B2 | 5/2013 | Rossotto |
| 8,989,921 | B2 | 3/2015 | Nannoni et al. |
| 9,073,635 | B2 | 7/2015 | Mezan |
| 9,156,541 | B2 | 10/2015 | Dequin et al. |
| 9,193,453 | B2 | 11/2015 | Vallart et al. |
| 9,205,915 | B2 | 12/2015 | Feyzeau et al. |
| 2007/0118254 | A1 | 5/2007 | Barnes et al. |
| 2011/0001637 | A1 | 1/2011 | Spiegel |
| 2014/0246541 | A1 | 9/2014 | Feyzeau et al. |

FOREIGN PATENT DOCUMENTS

| | | |
|---|---|---|
| CN | 103895862 A1 | 7/2014 |
| EP | 0945841 A1 | 9/1999 |
| EP | 2749495 A1 | 7/2014 |
| EP | 2775367 A2 | 9/2014 |
| FR | 2974564 A1 | 11/2012 |
| FR | 2981045 A1 | 4/2013 |
| FR | 3000465 A1 | 7/2014 |
| FR | 3000466 A1 | 7/2014 |
| FR | 3002803 A1 | 9/2014 |
| GB | 2192163 A | 1/1988 |
| JP | H05039094 | 2/1993 |
| WO | 2010143051 A2 | 12/2010 |

OTHER PUBLICATIONS

"Enhanced energy maneuverability for attack helicopters using continuous variable rotor speed collrol"; C.G. Schaefer Jr., F.H. Lutze, Jr., 47th Forum American Helicopter Society 1991; pp. 1293-1303.

French Search Report for French Application No. FR1770434, Completed by the French Patent Office, dated Dec. 6, 2017, 7 pages.

* cited by examiner

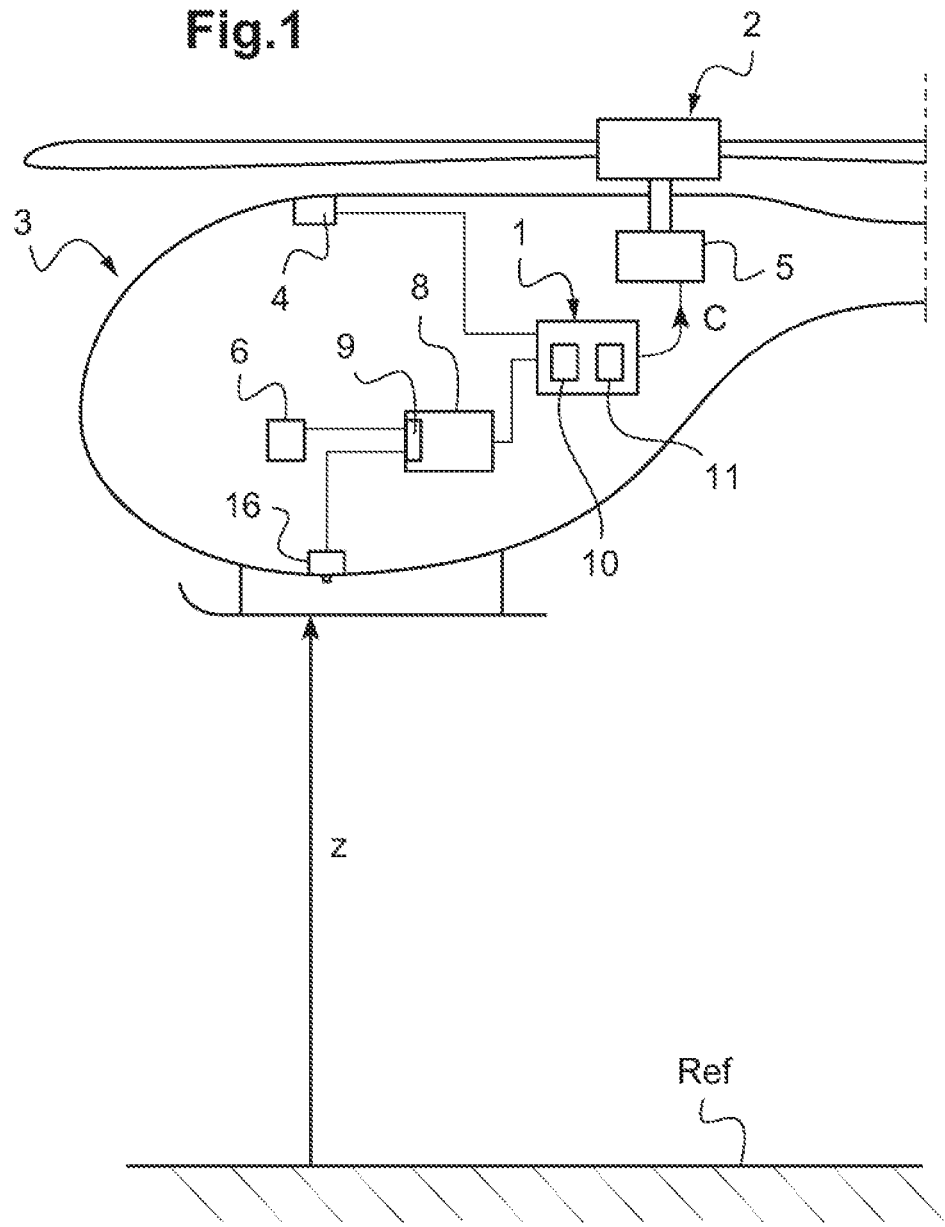

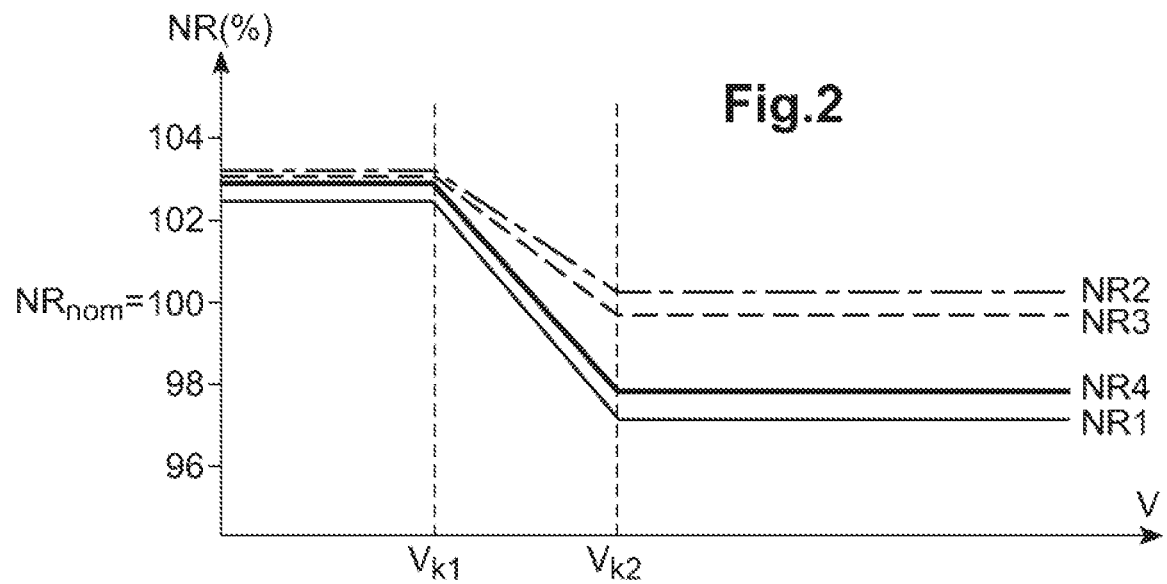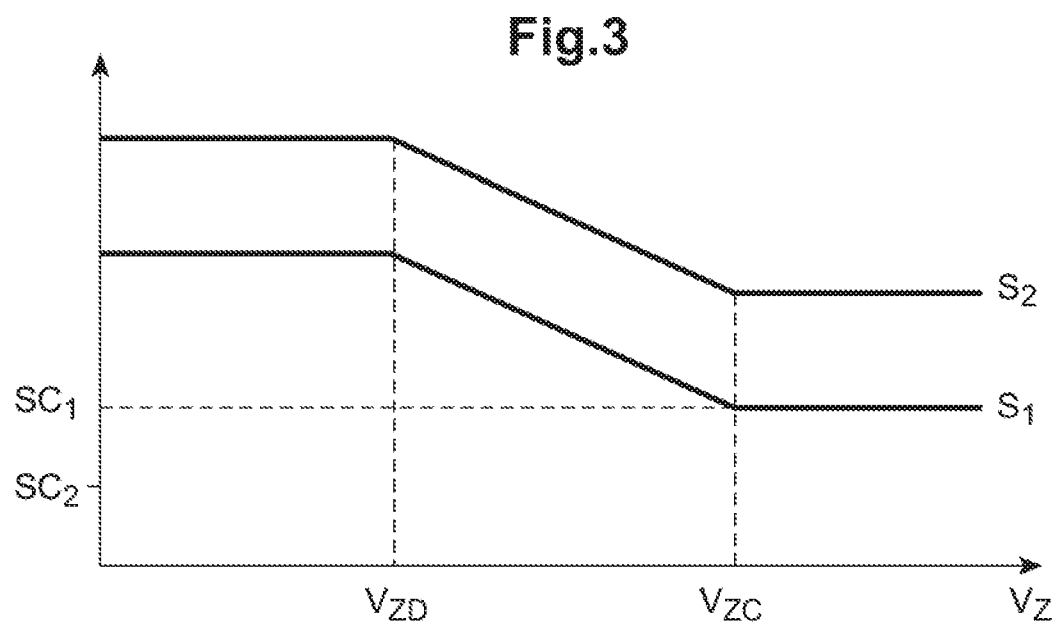

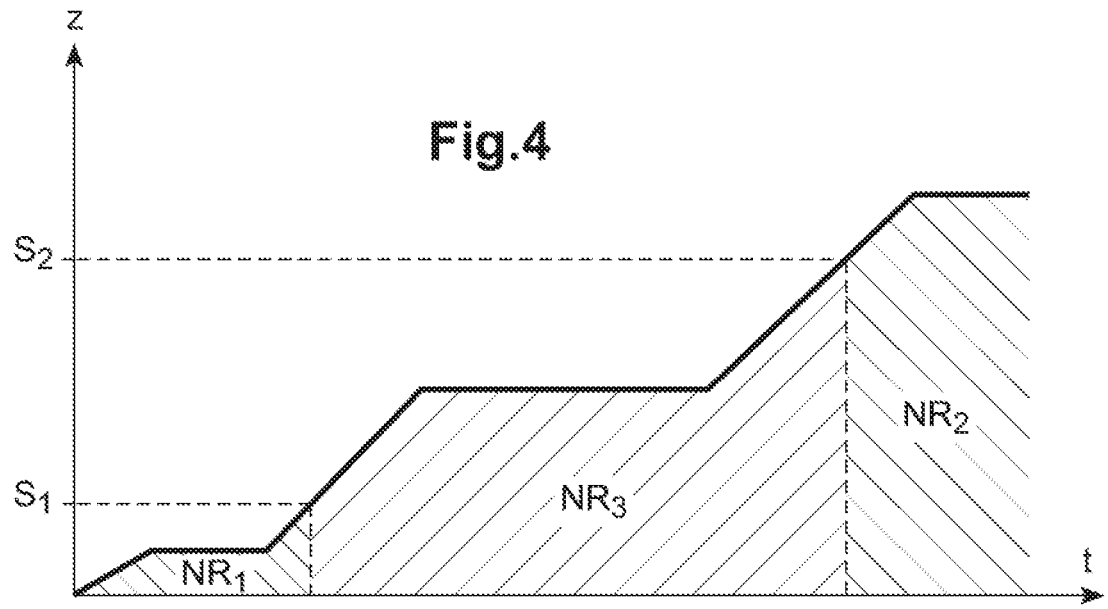
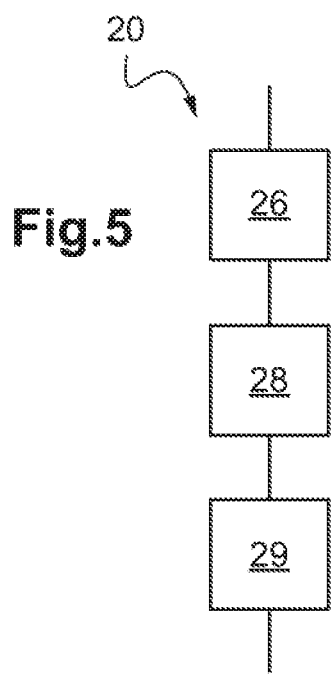

DEVICE FOR REGULATING A SETPOINT FOR A SPEED OF ROTATION OF A ROTORCRAFT ROTOR, A ROTORCRAFT FITTED WITH SUCH A DEVICE, AND AN ASSOCIATED METHOD OF REGULATION

CROSS-REFERENCE TO RELATED APPLICATIONS

This application claims priority to French patent application No. FR 1770434 filed on Apr. 28, 2017, the disclosure of which is incorporated in its entirety by reference herein.

BACKGROUND OF THE INVENTION

(1) Field of the Invention

The present invention relates to a device for regulating a setpoint for a speed of rotation, written NR, for at least one main rotor of a rotorcraft. Such a speed NR is thus directly a function of the quantity of fuel injected into the engine(s) in order to produce combustion that is to drive the main rotor in rotation.

Thus, the present invention also relates to the field of methods of regulating the operation of one or more engines in a power plant of a rotorcraft. By way of example, such a power plant comprises at least one main fuel-burning engine, in particular such as a turboshaft engine, that conventionally provides the rotorcraft with the mechanical power needed to drive at least one or more rotors of the rotorcraft.

Consequently, the present invention lies more specifically in the context of a regulation device and method serving to drive at least one main rotor of the rotorcraft at a variable setpoint speed, and where appropriate possibly also serving to drive an anti-torque rotor.

2) Description of Related Art

The main rotor typically serves to provide the rotorcraft at least with lift, and possibly also with propulsion and/or with changes of attitude in flight in the specific circumstance of a helicopter. The anti-torque rotor typically serves to stabilize and guide the rotorcraft in yaw, and it is commonly in the form of a tail rotor or of at least one propulsive propeller for a rotorcraft with high forward speeds.

Conventionally, the operation of the main engine(s) of the rotorcraft is under the control of a regulator unit such as a full authority digital engine control (FADEC). The regulator unit controls the metering of fuel to the main engine(s) as a function of a setpoint, referred to below as the NR speed setpoint, relating to the speed of rotation required of the main rotor. Under certain particular circumstances, the NR speed setpoint may be generated by the regulator unit (FADEC). In other particular circumstances, for example when the NR speed setpoint is variable, the NR speed setpoint may be generated by the electronic, electrical, and computer equipment of the rotorcraft acting together and it is then transmitted to the regulator unit (FADEC) by management means, such as an automatic flight control system (AFCS). Under such circumstances, the regulator unit (FADEC) serves to perform regulation on the NR speed setpoint.

Thus, the NR speed setpoint may be transmitted by the management means (AFCS) as a function of the needs of the rotorcraft for mechanical power as identified depending on the current flight situation of the rotorcraft, and in particular as a function of the mechanical power needed for driving the main rotor. By way of example, the power consumed by the main rotor may be identified firstly by evaluating the resistive torque that the main rotor opposes against being driven by the power plant, and secondly from its speed of rotation.

Nevertheless, the way technology is changing in the field of rotorcraft tends to encourage driving the main rotor at a controlled speed of rotation NR that is variable relative to the predefined nominal speed NRnom depending on the most critical conditions for the rotorcraft, e.g. corresponding to complex point takeoff or landing procedures commonly referred to by the term "CAT A procedures".

Specifically, such a significant variation in the speed NR at which the main rotor is driven is used to optimize the power level that is supplied by the engine(s) as a function of the associated stage of flight, e.g. in order to reduce sound nuisance close to the ground and/or in order to improve performance. By way of indication, the speed of rotation of the main rotor may be controlled to vary so as to depart from the nominal speed of rotation NRnom by 5% to 10%, or possibly by even more, depending on how technology changes, and more particularly the speed of rotation may be controlled variably over a range of values that might potentially extend from 90% to 115% of the nominal speed NRnom.

On this topic, reference may be made by way of example to the publication "Enhanced energy maneuverability for attack helicopters using continuous variable rotor speed control" (C. G. Schaefer Jr., F. H. Lutze, Jr., 47$^{th}$ Forum American Helicopter Society 1991; pp. 1293-1303). According to that document, the performance of a rotorcraft in a combat situation is improved by varying the speed at which the main rotor is driven, depending on variation in the air speed of the rotorcraft.

Reference may also be made by way of example to the Document U.S. Pat. No. 6,198,991 (Yamakawa et al.), which proposes reducing sound nuisance generated by a rotorcraft approaching a landing point by varying the speed of rotation of the main rotor.

On this topic, reference may also be made by way of example to the Document U.S. 2007/118254 (G. W. Barnes et al.) which proposes varying the speed of rotation of the main rotor of a rotorcraft depending on two values that are considered as being "low" and "high", under predetermined threshold conditions for values of various previously-identified parameters associated with the flying conditions of the rotorcraft.

Also by way of example, reference may be made on this topic to the Document WO 2010/143051 (Augusta Spa et al.), which proposes varying the speed of rotation of a main rotor of a rotorcraft in compliance with a previously-established map depending on various flying conditions of the rotorcraft.

Finally, as described by the Applicant in Documents FR 3 000 465, FR 3 000 466, and FR 3 002 803, and also in the Documents JP H05 39094 and EP 0 945 841, it is also known to make use of an altimeter in order to control automatic variation in the speed of rotation of a rotor over a range extending from 90% to 110% of a predetermined nominal value.

Furthermore, Documents FR 2 974 564, GB 2 192 163, and FR 2 981 045 describe other devices or methods for regulating a main rotor or a tail rotor of a rotorcraft.

Nevertheless, although such documents describe devices or methods for regulating the speed NR during the flight of a rotorcraft, such documents do not provide any solution enabling the NR speed control setpoint to be regulated automatically as a function of the absolute value of the vertical component Vz of the travel speed of the rotorcraft relative to a reference level, which may be land or an extent of water such as an ocean or a sea, in particular. Thus, those documents do not describe any solution making it possible to regulate the NR speed control setpoint automatically during stages of level flight of such a rotorcraft at a vertical elevation of more than 500 feet relative to such a reference level.

BRIEF SUMMARY OF THE INVENTION

An object of the present invention is thus to propose a device making it possible to overcome the above-mentioned limitations. In particular, an object of the regulation device or method in accordance with the invention is thus to enable the control setpoint for the NR speed of rotation of a rotorcraft rotor to be regulated automatically while it is flying with a travel speed having a small vertical component Vz during a mission at a vertical elevation lying in the range 500 feet to 2000 feet relative to a reference level, for example. Such automatic regulation of the control setpoint for the NR speed of rotation in flight thus makes it possible in particular to improve the performance of a rotorcraft flying at a substantially constant vertical elevation that is greater than a predetermined threshold relative to a reference level under consideration, e.g. 492 feet.

Furthermore, and below in this application, the term "vertical elevation" is used to mean a distance, measured in feet as is common practice in the field of aviation, in a direction that is substantially radial relative to the center of the earth. Such a vertical elevation may thus designate both a height relative to land or an extent of water situated under the rotorcraft and also an altitude that is measured relative to a reference level of atmospheric pressure.

Likewise, the term "reference level" is used below in this application to designate either land, or an extent of water situated under the rotorcraft, or indeed sea level or a level corresponding to a reference atmospheric pressure.

The invention thus provides a regulator device for regulating a control setpoint for a speed of rotation, written NR, for at least one main rotor of a rotorcraft, the regulator device fitting such a rotorcraft including:
- at least one measurement member for taking measurements representative of a current vertical elevation z, z', z" of the rotorcraft relative to a reference level; and
- measurement means for measuring a travel speed of the rotorcraft and serving to measure at least one vertical component Vz of a travel speed of the rotorcraft relative to the air surrounding the rotorcraft.

In addition, such a regulator device for regulating the control setpoint for the speed NR includes management means for automatically controlling the control setpoint for the speed NR in accordance with at least two predetermined control relationships NR1 and NR2 that are distinct from each other, the at least two predetermined control relationships NR1 and NR2 being selected as alternatives during a descending stage of flight of the rotorcraft, at least as a function of the measurements representative of the vertical elevation z, z', z" decreasing, the management means serving to control the control setpoint for the speed NR in accordance with:
- a first control relationship NR1 when the vertical elevation z, z', z" is less than a first predetermined threshold value S1; and
- a second control relationship NR2 that is selected to be distinct from the first control relationship NR1, whenever the vertical elevation z, z', z" is greater than a second predetermined threshold value S2 greater than the first predetermined threshold value S1.

According to the invention, such a regulator device is remarkable in that the first predetermined threshold value S1 is variable as a function of the vertical component Vz, such that:
- the first predetermined threshold value S1 is less than or equal to a first vertical elevation constant Sc1 when the vertical component Vz is greater than or equal to a vertical speed constant Vzc; and
- the first predetermined threshold value S1 is greater than the first vertical elevation constant Sc1 when the vertical component Vz is less than the vertical speed constant Vzc.

In other words, such a device for regulating the speed NR then makes it possible to adapt the first predetermined threshold value S1 automatically as a function of the vertical component Vz of the travel speed of the rotorcraft relative to the surrounding air. In addition, since the rotorcraft is than in a descending stage of flight, such a vertical component Vz may be in the form of a negative algebraic value.

Such adaptation then serves to improve the performance of the rotorcraft on which the device is installed by conserving the second control relationship NR2, thus giving precedence to the performance of the rotorcraft, in particular during level flight, e.g. at a vertical elevation lying in the range 500 feet to 2000 feet relative to the reference level.

By way of example, the first control relationship NR1 may thus serve to lower the control setpoint for the speed of rotation NR to a value that is less than the nominal value, e.g. equal to 94% of the nominal value, when the current vertical elevation z, z', z" of the rotorcraft relative to the reference level is less than the first predetermined threshold value S1. This first control relationship NR1, also referred to as the "acoustic control" relationship, then serves to limit the sound footprint of the rotorcraft on the surrounding medium as a function of the speed of advance of the rotorcraft.

Conversely, the second control relationship NR2 may serve to increase the control setpoint for the speed of rotation NR to a level that is greater than or equal to a nominal value, at least when the current vertical elevation z, z', z" of the rotorcraft relative to the reference level is greater than a second predetermined threshold value S2 greater than the first predetermined threshold value S1. Under such circumstances, only the first control relationship NR1 is capable of satisfying requirements for reducing sound level as a function of the vertical elevation z, z', z" and of a speed of advance of the rotorcraft in a direction that is substantially horizontal.

Thus, the first control relationship NR1 may be the control relationship that is used by default at a low vertical elevation since it makes it possible, depending on the flying situation of the rotorcraft, to limit its sound footprint on the outside medium. Nevertheless, such a first control relationship NR1 may have the effect of limiting the flying performance of a rotorcraft.

The second control relationship NR2 cannot be used by default at low vertical elevation, and may be used automatically during missions of the rotorcraft at medium or high vertical elevation. Such a second control relationship NR2 serves to guarantee the flying performance of the aircraft in a vertical elevation range for which the sound footprint of the rotorcraft is not problematic for its immediate environment.

Furthermore, the measurement means for measuring the vertical component Vz of the speed of the rotorcraft relative to the air may in particular comprise a unidirectional air speed indicator, or indeed an omnidirectional air speed indicator, in order to measure an air flow speed relative to the fuselage of the rotorcraft.

As mentioned above, the management means may consist in the automatic flight control system (AFCS) of the rotorcraft.

Advantageously, the vertical speed constant Vzc may be selected to be close to zero, the first predetermined threshold value S1 being less than or equal to a first vertical elevation constant Sc1 when the vertical component Vz is close to zero, and the first predetermined threshold value S1 is greater than the first vertical elevation constant Sc1 when the vertical component Vz is less than −400 feet per minute.

In other words, when the rotorcraft is performing level flight in a direction that is substantially horizontal, the first predetermined threshold value S1 is less than or equal to the first vertical elevation constant Sc1.

In practice, the second predetermined threshold value S2 may be the sum of the first predetermined threshold value S1 plus a second vertical elevation constant Sc2.

This second vertical elevation constant Sc2 is then selected to be sufficiently great to ensure that the second predetermined threshold value S2 is distinct from and greater than the first predetermined threshold value S1.

According to an advantageous characteristic of the invention, the first vertical elevation constant Sc1 may lie in the range 400 feet to 600 feet relative to the reference level and is preferably equal to 492 feet relative to the reference level Ref.

Such a value for the first vertical elevation constant Sc1 thus serves to guarantee optimum performance for the rotorcraft at a vertical elevation greater than 492 feet relative to the reference level, without pointlessly reducing the NR speed setpoint while the rotorcraft is performing level flight.

Advantageously, the second vertical elevation constant Sc2 may lie in the range 300 feet to 500 feet, and is preferably equal to 400 feet.

This value for the second vertical elevation constant Sc2 then serves to guarantee optimum performance for the rotorcraft at a vertical elevation greater than 892 feet relative to the reference level, without pointlessly reducing the NR speed setpoint when the rotorcraft is flying above that vertical elevation, with this applying regardless of the value of the vertical component Vz of the travel speed of the rotorcraft. Such a second predetermined threshold value S2 equal to 892 feet relative to the reference level then corresponds to the sum of the first vertical elevation constant Sc1, which is preferably equal to 492 feet relative to the reference level, plus the second vertical elevation constant Sc2, which is preferably equal to 400 feet.

In practice, the management means may serve to control the control setpoint for the speed NR in accordance with a third control relationship NR3 distinct from the first control relationship NR1 whenever, firstly the vertical component Vz is greater than or equal to the vertical speed constant Vzc, and secondly the vertical elevation z, z', z" is greater than the first predetermined threshold value S1.

In other words, such a third control relationship NR3 is used by the management means during a stage of substantially level flight of the rotorcraft at a vertical elevation situated above the first predetermined threshold value S1. Such an arrangement then also makes it possible to avoid limiting the performance of the rotorcraft by not pointlessly reducing the control setpoint for the speed NR while the rotorcraft is flying above this first predetermined threshold value S1 and the vertical component Vz of the travel speed of the rotorcraft is small, being greater than or equal to the vertical speed constant Vzc, which may advantageously be zero.

According to an advantageous characteristic of the invention, the third control relationship NR3 may be identical to the second control relationship NR2.

Under such circumstances, the performance of the rotorcraft may be optimized as soon as it is flying at a vertical elevation z, z', z" that is greater than the first predetermined threshold value S1.

Advantageously, the management means may serve to control the control setpoint for the speed NR in accordance with a fourth control relationship NR4 distinct from the first and second control relationships NR1 and NR2 whenever, firstly the vertical component Vz is less than the vertical speed constant Vzc, and secondly the vertical elevation z, z', z" lies between the first predetermined threshold value S1 and the second predetermined threshold value S2.

Such a fourth control relationship NR4 is then advantageously used by the management means so as to cause the control setpoint for the speed of rotation to vary, e.g. from a high initial value corresponding to the second control relationship NR2 to a low value lower than the high value, the low value corresponding to the first control relationship NR1.

In practice, the fourth control relationship NR4 may make a progressive transition between the second control relationship NR2 and the first control relationship NR1.

In this way, the management means using the fourth control relationship NR4 make it possible to avoid suddenly changing the control setpoint for the speed NR. The pilot of the rotorcraft can then sense this progressive change in the speed NR of the main rotor directly as being generated automatically by the management means and not as being a sudden change, which might be indicative of an engine failure.

In addition, the invention also provides a rotorcraft comprising:
  at least one main rotor driven by at least one engine;
  at least one measurement member for taking measurements representative of a current vertical elevation z, z', z" of the rotorcraft relative to a reference level;
  measurement means for measuring a travel speed of the rotorcraft and serving to measure at least one vertical component Vz of a travel speed of the rotorcraft relative to the air surrounding the rotorcraft; and
  a regulator device for regulating a control setpoint for a speed of rotation, written NR, for the main rotor(s) of the rotorcraft, the regulator device for regulating the control setpoint of the speed NR including management means for automatically controlling the control setpoint for the speed NR in accordance with at least two predetermined control relationships NR1, NR2 that are distinct from each other, the at least two predetermined control relationships NR1, NR2 being selected as alternatives during a stage of descending flight of the rotorcraft at least as a function of the measurements representative of the vertical elevation z, z', z" decreasing relative to the reference level, the management means serving to control the control setpoint for the speed NR in accordance with:
    a first control relationship NR1 when the vertical elevation z, z', z" is less than a first predetermined threshold value S1; and
    a second control relationship NR2 that is selected to be distinct from the first control relationship NR1, whenever the vertical elevation z, z', z" is greater than a second predetermined threshold value S2 greater than the first predetermined threshold value S1.

Such a rotorcraft is remarkable in that it includes a regulator device for regulating the control setpoint for the speed NR as described above.

According to an advantageous characteristic of the invention, the measurement member(s) may comprise:
- a first altimeter, referred to as a "pressure altimeter" for taking a measurement of atmospheric pressure and comparing the measurements with a reference atmospheric pressure in order to determine a pressure altitude z' of the rotorcraft at which the atmospheric pressure measurement is taken; and
- a second altimeter referred to as a "radio altimeter" enabling a radio altimeter height z" of the rotorcraft to be measured relative to the surface by transmitting a wave that is to be reflected by the surface and by measuring the time required by the wave to travel a go-and-return distance between the rotorcraft and the surface; and
- the rotorcraft may have calculation means for calculating a vertical elevation z referred to as a "radio-hybrid" elevation, by filtering the pressure altitude z' and the radio altimeter height z".

Said pressure altimeter measures an atmospheric pressure difference between the reference level, which is generally input manually by the crew of the rotorcraft, and the current altitude of the pressure altimeter. The selected reference level, corresponding to a display of "0", thus depends on the particular stage of flight of the rotorcraft and is generally the level of the departure or destination airfield of the rotorcraft. In other stages of flight, the reference level may also be selected as being the level corresponding to sea level.

The pressure altimeter is calibrated in compliance with the way atmospheric pressure varies with altitude in a standard atmosphere. Taking sea level as the reference altitude h0, and taking a mean state for the atmosphere as defined by the international civil aviation organization (ICAO) type standard atmosphere (temperature 15° C.=288.15 K, pressure 1013.25 hectopascals (hPa) and a vertical temperature gradient of 0.65 K per 100 meters (m)), the following international pressure leveling formula is obtained:

$$p(h) = 1013.25\left(1 - \frac{0.0065 \cdot h}{288.15}\right)^{5.255} hPa$$

This formula enables pressure to be calculated at a certain altitude without needing to know the temperature or the vertical temperature gradient. Accuracy in practical applications is nevertheless limited, since the selected state is a mean state that differs from the real state of the atmosphere.

The radio altimeter, which is also commonly referred to as a radar altimeter, is apparatus installed onboard the rotorcraft for the purpose of measuring its height above the surface, i.e. land or water surface. In aviation, it is a piloting assistance instrument that is used while flying missions without visibility, i.e. instrument flying. It gives the height of the aircraft above the surface and not its pressure altitude as measured by a simple altimeter. The height that corresponds to the rotorcraft "0" level is the vertical elevation at which the landing gear of the rotorcraft would come into contact with the surface during a stage of landing.

A transmit antenna on the rotorcraft transmits a wave towards the surface, where it is reflected in diffuse manner. A fraction of the energy is thus returned towards the rotorcraft and picked up by the receive antenna, with the time from transmission to reception giving a measurement of distance:

$$\Delta t = \frac{2 \times z''}{C}$$

where:
- $\Delta t$ is the time needed by the wave to perform a go-and-return path between the rotorcraft and the surface;
- z" is the radio altimeter height of the rotorcraft above the surface; and
- C is the speed of light in the medium through which the wave passes.

In order to make best use of the advantages of each of the first and second altimeters, the measurements may be taken in combined manner and then they may be filtered. A first filter may be a highpass filter that is applied to the measurement taken by the pressure altimeter, and a second filter may be a lowpass filter that is applied to the measurement taken by the radio altimeter. This filtering of the signals from these two altimeters then makes it possible to obtain a vertical elevation z referred to as the "radio-hybrid" elevation, which may be obtained by calculation using the following equation:

$$z(s) = F(s) \times z'' + [1 - F(s)] \times z'$$

One purpose of such filtering is thus to attenuate high frequency components from the signal generated by the radio altimeter, with the expression F(s) designating a lowpass type filter, and the expression [1-F(s)] designating a highpass type filter.

Such a solution then enables the management means to avoid switching in repeated and unwanted manner between the sound relationship corresponding to the first control relationship NR1 and the nominal relationship corresponding to the second control relationship NR2. Specifically, without such filtering of the high frequency component from the signal generated by the radio altimeter, untimely switching could occur by way of example in the event of the rotorcraft flying at low vertical elevation over rough terrain.

Finally, the invention also provides a method of regulating the control setpoint for the speed of rotation, written NR, for at least one main rotor of a rotorcraft, such a method comprising at least the steps consisting in:
- a first measurement step for taking measurements representative of a current vertical elevation z, z', z" of the rotorcraft relative to a reference level;
- a second measurement step for measuring at least one vertical component Vz of a travel speed of the rotorcraft relative to the air surrounding the rotorcraft; and
- a management step for automatically controlling the control setpoint for the speed NR in accordance with at least two predetermined control relationships NR1 and NR2 that are distinct from each other, the at least two predetermined control relationships NR1 and NR2 being selected as alternatives during a descending stage of flight of the rotorcraft, at least as a function of the measurements representative of the vertical elevation z, z', z" decreasing, the management step serving to control the control setpoint for the speed NR in accordance with:
  - a first control relationship NR1 when the vertical elevation z, z', z" is less than a first predetermined threshold value S1; and a second control relationship NR2 that is selected to be distinct from the first control relationship NR1, whenever the vertical elevation z, z', z" is greater than a second predetermined threshold value S2 greater than the first predetermined threshold value S1.

According to the invention, such a method is remarkable in that the first predetermined threshold value S1 is variable as a function of the vertical component Vz, such that:

the first predetermined threshold value S1 is less than or equal to a first vertical elevation constant Sc1 when the vertical component Vz is greater than or equal to a vertical speed constant Vzc; and the first predetermined threshold value S1 is greater than the first vertical elevation constant Sc1 when the vertical component Vz is less than the vertical speed constant Vzc.

In other words, this method of regulating the control setpoint for the speed NR serves to modify the first predetermined threshold value S1 during a mission of the rotorcraft, and to do so automatically and at all times, as a function of the vertical component Vz of the travel speed of the rotorcraft relative to the air surrounding it.

Advantageously, the management step may control the control setpoint for the speed NR in accordance with a third control relationship NR3 distinct from the first control relationship NR1 whenever, firstly the vertical component Vz is greater than or equal to the vertical speed constant Vzc, and secondly the vertical elevation z, z', z" is greater than the first predetermined threshold value S1.

In other words, the management step controls the control setpoint for the speed NR in accordance with a third control relationship NR3 during a stage of substantially level flight of the rotorcraft at a vertical elevation z, z', z" situated above the first predetermined threshold value S1. Such a method of regulation then also makes it possible to avoid limiting the performance of the rotorcraft by not pointlessly reducing the control setpoint for the speed NR while the rotorcraft is flying above this vertical elevation S1 and the vertical component Vz of its travel speed relative to the surrounding air is small, being greater than or equal to the vertical speed constant Vzc, which may advantageously be zero.

In practice, the management step may control the control setpoint for the speed NR in accordance with a fourth control relationship NR4 distinct from the first and second control relationships NR1 and NR2 whenever, firstly the vertical component Vz is less than the vertical speed constant Vzc, and secondly the vertical elevation z, z', z" lies in the range from the first predetermined threshold value S1 to the second predetermined threshold value S2.

Thus, the management step may control the control setpoint for the speed NR in accordance with the fourth control relationship NR4 so as to cause the speed of rotation NR to vary, e.g. so as to make a progressive transition between the first control relationship NR1 and the second control relationship NR2 while the measurements representative of the vertical elevation z, z', z" are increasing. Conversely, the fourth control relationship NR4 can make a progressive transition from the second control relationship NR2 to the first control relationship NR1 while the measurements representative of the vertical elevation z, z', z" are decreasing.

In this way, the management step controls the control setpoint for the speed NR in accordance with the fourth control relationship NR4 so as to avoid suddenly changing the speed of rotation NR of the main rotor of the rotorcraft. The pilot of the rotorcraft can then sense this progressive variation of the speed of rotation NR directly and can identify it as being generated automatically by the management step of the regulation method and not as being a sudden variation, which might be an indication of an engine failure.

BRIEF DESCRIPTION OF THE DRAWINGS

The invention and its advantages appear in greater detail from the context of the following description of examples given by way of non-limiting indication and with reference to the accompanying figures, in which:

FIG. 1 is a diagrammatic side view of a rotorcraft in accordance with the invention;

FIG. 2 plots curves showing the control relationship for the NR speed control setpoint for a rotorcraft main rotor as a function of the speed of advance V of the rotorcraft in a substantially horizontal direction, in accordance with the invention;

FIG. 3 plots curves showing variations in the first and second predetermined threshold values S1 and S2 as a function of the vertical component Vz of the travel speed of the rotorcraft relative to the surrounding air;

FIG. 4 plots a curve showing the domains of various control relationships for the NR speed control setpoint as a function of the vertical elevation z of the rotorcraft; and FIG. 5 is a diagram of a method of regulation in accordance with the invention.

DETAILED DESCRIPTION OF THE INVENTION

Elements present in more than one of the figures are given the same references in each of them.

As mentioned above, the invention relates to the field of rotorcraft having at least one main rotor enabling the rotorcraft to be provided at least with lift.

As shown in FIG. 1, such a rotorcraft 3 comprises a regulator device 1 for regulating a control setpoint for a speed NR of rotation of the main rotor 2. Such a regulator device 1 is thus suitable for generating and transmitting a control setpoint C to an engine 5 driving the main rotor 2 in rotation.

Furthermore, such a regulator device 1 is connected, e.g. electrically by wire or by wireless communication means, to calculation means 8. These calculation means 8 have input members 9 for enabling them to be connected with at least one measurement member 6, 16 for measuring a current vertical elevation z, z', z" of the rotorcraft 3 relative to a reference level Ref.

Furthermore, such a regulator device 1 may include management means 10 for controlling the NR speed control setpoint in application of various different predetermined control relationships NR1, NR2, NR3, and NR4, which may advantageously be stored in a memory 11.

The management means 10 then serve to control the NR speed control setpoint in compliance with:

a first control relationship NR1 when the vertical elevation z, z', z" is less than a first predetermined threshold value S1; and a second control relationship NR2 that is selected to be distinct from the first control relationship NR1, whenever the vertical elevation z, z', z" is greater than a second predetermined threshold value S2 greater than the first predetermined threshold value S1.

In addition, the rotorcraft 3 may include a first measurement member 6 referred to as a "pressure altimeter" that serves to measure atmospheric pressure and compare the measurement with a reference atmospheric pressure in order to determine a pressure altitude z' of the rotorcraft 3 at which the measurement of atmospheric pressure is taken.

As shown, the rotorcraft 3 may also have a second measurement member 16 referred to as a "radio altimeter" for measuring a radio altimeter height z" of the rotorcraft 3 relative to surface by transmitting a wave that is reflected by the surface and measuring the time required by the wave to travel a go-and-return distance between the rotorcraft 3 and the surface.

Under such circumstances, the calculation means 8 may then serve to calculate a vertical elevation z referred to as a "radio-hybrid" elevation, by filtering the pressure altitude z' and the radio altimeter height z" relative to the surface.

Furthermore, such a rotorcraft 3 also has measurement means 4 for measuring a travel speed of the rotorcraft 3. Such measurement means 4 may then be formed by at least one air speed indicator for measuring an air flow speed relative to the fuselage of the rotorcraft 3. The measurement means 4 then generate at least measurements for the value of the vertical component Vz of the travel speed of the rotorcraft 3 relative to the surrounding air.

The regulator device 1 is connected to the measurement member 4 and can thus modify automatically the relationship for controlling the speed of rotation NR of the main rotor 2 as a function firstly of the vertical elevation z of the rotorcraft 3 and secondly of measurements of the vertical component Vz, which are then constituted by negative algebraic values while the rotorcraft 3 is descending.

FIG. 2 shows the variations in two control relationships NR1 and NR2, together with variations in third and fourth control relationships NR3 and NR4 as a function of the speed of advance V of the rotorcraft 3 in a direction that is substantially horizontal relative to the surface.

In general manner, it can be seen in FIG. 2 that when the speed of advance V increases, the control relationships NR1, NR2, NR3, and NR4 may decrease. At a small speed of advance V, the need for engine power is at a maximum and the speed of rotation NR of the main rotor 2 is greater than the nominal value NRnom corresponding to a value of 100%.

As from a speed of advance threshold $Vk_1$, it becomes possible to reduce the speed of rotation NR of the main rotor 2 towards the value NRnom in order to conserve an sufficient nominal speed of rotation while limiting the fuel consumption of the rotorcraft 3 but without any effect on the flying performance of the rotorcraft 3. The reduction in the speed of rotation NR of the main rotor 2 may also reach values that are less than the value NRnom so as to satisfy sound level requirements as a function of the vertical elevation z, z', z" and/or as a function of the vertical component Vz of the travel speed of the rotorcraft 3 relative to the surrounding air.

As from a speed of advance threshold $Vk_2$, the speed of rotation NR of the main rotor 2 may then stabilize on a value close to the value NRnom for the control relationships NR2 and NR3, or less than the value NRnom for the control relationships NR1 and NR4.

Thus, the control relationships NR1 and NR4 may correspond to relationships that enable the sound footprint of the rotorcraft 3 to be limited, and consequently they enable the speed of rotation NR of the main rotor 2 to be reduced to less than the value NRnom.

In contrast, the control relationships NR2 and NR3 serve to reduce the speed of rotation NR of the main rotor 2 so that it tends towards the value NRnom, thereby giving precedence to the flying performance of the rotorcraft 3.

As shown in FIG. 3, the first predetermined threshold value S1 varies as a function of the vertical component Vz of the travel speed of the rotorcraft 3 relative to the surrounding air. In this example, this first predetermined threshold value S1 is shown as being equal to a vertical elevation constant while the vertical component Vz is less than or equal to a vertical speed constant $Vz_D$. In this implementation, such a vertical speed constant $Vz_D$ may be close to −1000 feet per minute.

The first predetermined threshold value S1 is then shown in the form of a function that decreases as a function of the vertical component Vz and that decreases down to a first vertical elevation constant Sc1 when the vertical component Vz is equal to a vertical speed constant Vzc. In one implementation, such a vertical speed constant Vzc may be close to zero.

The first predetermined threshold value S1 thus decreases and then stabilizes so as to become once more a constant function as from the instant when the vertical component Vz becomes greater than the vertical speed constant Vzc.

The second predetermined threshold value S2 is shown as being the sum of the first predetermined threshold value S1 plus a second vertical elevation constant Sc2.

Thus, such a regulator device 1 has management means 10 for automatically controlling the speed of rotation NR in compliance with at least two predetermined speeds NR1 and NR2 that are different from each other in order to modify and reduce the speed of rotation NR of the rotor 2 when the power needed is not at a maximum, i.e. in particular during movements of the rotorcraft 3 on the ground.

As mentioned above, and as shown in FIG. 4, the NR speed control setpoint may be selected depending on various different control relationships NR1, NR2, and NR3. The curve thus represents the current vertical elevation z of the rotorcraft 3 as a function of time relative to a reference level. This curve then makes it possible to illustrate corresponding domains.

In addition, the management means 10 serve to control the NR speed control setpoint in application of the third control relationship NR3 that is distinct from the first control relationship NR1 whenever, firstly the vertical component Vz is greater than or equal to the vertical speed constant Vzc, and secondly the vertical elevation z is greater than the first predetermined threshold value S1.

As shown in FIG. 5, the invention also relates to a regulation method 20 for regulating the control setpoint for the speed of rotation NR of the rotor 2 of the rotorcraft 3.

Such a regulation method 20 thus comprises at least a first measurement step 26 for taking measurements representative of a current vertical elevation z of the rotorcraft 3 relative to the surface.

Thereafter, the regulation method 20 comprises a second measurement step 28 for measuring at least one vertical component Vz of a travel speed of the rotorcraft 3 relative to the surrounding air. This second measurement step 28 is thus performed on the basis of measurements that may be taken by the measurement means 4 arranged on the rotorcraft 3.

Finally, the regulation method 20 has a management step 29 for automatically controlling the control setpoint for the speed NR in application of at least two predetermined control relationships NR1 and NR2 that are distinct from each other. These at least two predetermined control relationships NR1 and NR2 may then be selected as alternatives, at least as a function of the measurements representing the vertical elevation z of the rotorcraft 3 relative to a reference level.

This management step 29 thus serves to control the control setpoint for the speed NR in application of a first control relationship NR1 when the vertical elevation z is less than a first predetermined threshold value S1, and in accordance with a second control relationship NR2 when the vertical elevation z is greater than a second predetermined threshold value S2 greater than the first predetermined threshold value S1.

As mentioned above, the first predetermined threshold value S1 is then variable as a function of the vertical component Vz of the rotorcraft 3 relative to the surrounding air. Specifically, the first predetermined threshold value S1 is then selected to be less than or equal to a first vertical elevation constant Sc1 when the vertical component Vz is greater than or equal to a vertical speed constant Vzc. Alternatively, the first predetermined threshold value S1 is greater than the first vertical elevation constant Sc1 when the vertical component Vz is less than the vertical speed constant Vzc.

Furthermore, the management step 29 may also control the control setpoint for the speed NR in accordance with the third control relationship NR3 that is distinct from the first control relationship NR1 whenever, firstly the vertical component Vz is greater than or equal to the vertical speed constant Vzc, and secondly the vertical elevation z is greater than the first predetermined threshold value S1.

Such a third control relationship NR3 may then consist in a relationship that is intermediate between the first control relationship NR1 giving preference to the sound level of the rotorcraft in flight to the detriment of its performance, and the second control relationship NR2 giving preference on the contrary to the performance of the rotorcraft to the detriment of its sound footprint, but without impact on the environment since remote from dwellings and populations.

This third control relationship NR3 may also coincide in full or in part with the second control relationship NR2, i.e. they may be the same over certain ranges of values for the speed of advance V of the rotorcraft.

In addition, the management step 29 may also control the setpoint for the speed NR in accordance with the fourth control relationship NR4 that is distinct from the first and second control relationships NR1 and NR2 whenever, firstly the vertical component Vz is less than the vertical speed constant Vzc, and secondly the vertical elevation z lies between the first predetermined threshold value S1 and the second predetermined threshold value S2.

As shown in FIG. 2, such a fourth control relationship NR4 then serves to make a progressive transition between the second control relationship NR2 and the first control relationship NR1.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A regulator device for regulating a control setpoint for a speed of rotation for at least one main rotor of a rotorcraft, the regulator device fitting a rotorcraft including:
   at least one measurement member for taking measurements representative of a current vertical elevation of the rotorcraft relative to a reference level; and
   measurement means for measuring a travel speed of the rotorcraft and serving to measure at least one vertical component of a travel speed of the rotorcraft relative to the air surrounding the rotorcraft;
   the regulator device for regulating the control setpoint for the speed including management means for automatically controlling the control setpoint for the speed in accordance with at least two predetermined control relationships that are distinct from each other, the at least two predetermined control relationships being selected as alternatives during a descending stage of flight of the rotorcraft, at least as a function of the measurements representative of the vertical elevation decreasing, the management means serving to control the control setpoint for the speed in accordance with:
   a first control relationship when the vertical elevation is less than a first predetermined threshold value; and
   a second control relationship that is selected to be distinct from the first control relationship, whenever the vertical elevation is greater than a second predetermined threshold value greater than the first predetermined threshold value;
   wherein the first predetermined threshold value is variable as a function of the vertical component, such that:
   the first predetermined threshold value is less than or equal to a first vertical elevation constant when the vertical component is greater than or equal to a vertical speed constant; and
   the first predetermined threshold value is greater than the first vertical elevation constant when the vertical component is less than the vertical speed constant.

2. The device according to claim 1, the first predetermined threshold value being less than or equal to a first vertical elevation constant, and the first predetermined threshold value is greater than the first vertical elevation constant when the vertical component is less than −400 feet per minute.

3. The device according to claim 2, wherein the second predetermined threshold value is the sum of the first predetermined threshold value plus a second vertical elevation constant.

4. The device according to claim 1, wherein the first vertical elevation constant lies in the range 400 feet to 600 feet relative to the reference level.

5. The device according to claim 3, wherein the second vertical elevation constant lies in the range 300 feet to 500 feet.

6. The device according to claim 1, wherein the management means serve to control the control setpoint for the speed in accordance with a third control relationship distinct from the first control relationship whenever, firstly the vertical component is greater than or equal to the vertical speed constant, and secondly the vertical elevation is greater than the first predetermined threshold value.

7. The device according to claim 6, wherein the third control relationship is identical to the second control relationship.

8. The device according to claim 1, wherein the management means serve to control the control setpoint for the speed in accordance with a fourth control relationship distinct from the first and second control relationships whenever, firstly the vertical component is less than the vertical speed constant, and secondly the vertical elevation lies between the first predetermined threshold value and the second predetermined threshold value.

9. The device according to claim 8, wherein the fourth control relationship makes a progressive transition between the second control relationship and the first control relationship.

10. A rotorcraft comprising:
   at least one main rotor driven by at least one engine; and
   the regulator device according to claim 1.

11. The rotorcraft according to claim 10, wherein the at least one measurement member comprises:
   a first altimeter which is a pressure altimeter for taking a measurement of atmospheric pressure and comparing the measurements of atmospheric pressure with a reference atmospheric pressure in order to determine a pressure altitude of the rotorcraft at which the atmospheric pressure measurement is taken; and
   a second altimeter which is a radio altimeter enabling a radio altimeter height of the rotorcraft to be measured relative to the surface by transmitting a wave that is to be reflected by the surface and by measuring the time required by the wave to travel a go-and-return distance between the rotorcraft and the surface; and
   wherein the rotorcraft is capable of calculating a vertical elevation which is a radio-hybrid elevation calculated by filtering the pressure altitude and the radio altimeter height.

12. A method of regulating a control setpoint for a speed of rotation, written, for at least one main rotor of a rotorcraft, the method comprising at least the steps consisting in:
   a first measurement step for taking measurements representative of a current vertical elevation of the rotorcraft relative to a reference level;
   a second measurement step for measuring at least one vertical component of a travel speed of the rotorcraft relative to the air surrounding the rotorcraft; and
   a management step for automatically controlling the control setpoint for the speed in accordance with at least two predetermined control relationships that are distinct from each other, the at least two predetermined control relationships being selected as alternatives during a descending stage of flight of the rotorcraft, at least as a function of the measurements representative of the vertical elevation decreasing, the management step serving to control the control setpoint for the speed in accordance with:
   a first control relationship when the vertical elevation is less than a first predetermined threshold value; and
   a second control relationship that is selected to be distinct from the first control relationship, whenever the vertical elevation is greater than a second predetermined threshold value greater than the first predetermined threshold value;
   wherein the first predetermined threshold value is variable as a function of the vertical component, such that:
   the first predetermined threshold value is less than or equal to a first vertical elevation constant when the vertical component is greater than or equal to a vertical speed constant; and
   the first predetermined threshold value is greater than the first vertical elevation constant when the vertical component is less than the vertical speed constant.

13. The method according to claim 12, wherein the management step controls the control setpoint for the speed in accordance with a third control relationship distinct from the first control relationship whenever, firstly the vertical component is greater than or equal to the vertical speed constant, and secondly the vertical elevation is greater than the first predetermined threshold value.

14. The method according to claim 12, wherein the management step controls the control setpoint for the speed in accordance with a fourth control relationship distinct from the first and second control relationships, whenever firstly the vertical component is less than the vertical speed constant and secondly the vertical elevation lies in the range from the first predetermined threshold value to the second predetermined threshold value.

15. The device according to claim 1, wherein the vertical speed constant is selected to be zero, the first predetermined threshold value being less than or equal to a first vertical elevation constant when the vertical component is zero, and the first predetermined threshold value is greater than the first vertical elevation constant when the vertical component is less than −400 feet per minute.

16. The device according to claim 1, wherein the first vertical elevation constant lies 492 feet relative to the reference level, and the second predetermined threshold value is the sum of the first predetermined threshold value plus a second vertical elevation constant, wherein the second vertical elevation constant is 400 feet.

17. A regulator device for regulating a control setpoint for a speed of rotation for a main rotor of a rotorcraft, the regulator device fitting a rotorcraft including:
   a measurement member for taking measurements representative of a current vertical elevation of the rotorcraft relative to a reference level; and
   travel speed detector for measuring a travel speed of the rotorcraft and serving to measure a vertical component of a travel speed of the rotorcraft relative to the air surrounding the rotorcraft;
   the regulator device for regulating the control setpoint for the speed including management controls for automatically controlling the control setpoint for the speed in accordance with at least two predetermined control relationships that are distinct from each other, the at least two predetermined control relationships being selected as alternatives during a descending stage of flight of the rotorcraft, at least as a function of the measurements representative of the vertical elevation decreasing, the management controls serving to control the control setpoint for the speed in accordance with:
   a first control relationship when the vertical elevation is less than a first predetermined threshold value; and
   a second control relationship selected to be distinct from the first control relationship, whenever the vertical elevation is greater than a second predetermined threshold value greater than the first predetermined threshold value;
   wherein the first predetermined threshold value is variable as a function of the vertical component, such that:
   the first predetermined threshold value is less than or equal to a first vertical elevation constant when the vertical component is greater than or equal to a vertical speed constant; and
   the first predetermined threshold value is greater than the first vertical elevation constant when the vertical component is less than the vertical speed constant.

18. The device according to claim 17, the first predetermined threshold value being less than or equal to a first vertical elevation constant, and the first predetermined threshold value is greater than the first vertical elevation constant when the vertical component is less than −400 feet per minute.

19. The device according to claim 18, wherein the second predetermined threshold value is the sum of the first predetermined threshold value plus a second vertical elevation constant.

20. The device according to claim 17, wherein the management controls serve to control the control setpoint for the speed in accordance with a third control relationship distinct from the first control relationship whenever, firstly the vertical component is greater than or equal to the vertical speed constant, and secondly the vertical elevation is greater than the first predetermined threshold value, and wherein the third control relationship is identical to the second control relationship.

\* \* \* \* \*